United States Patent [19]
McLamb

[11] 4,126,087
[45] Nov. 21, 1978

[54] COOKER

[76] Inventor: Willie J. McLamb, Benson, N.C. 27504

[21] Appl. No.: 728,753

[22] Filed: Oct. 1, 1976

[51] Int. Cl.² .............................................. A47J 27/62
[52] U.S. Cl. .................................... 99/327; 99/467
[58] Field of Search ............... 99/444, 327, 358, 375, 99/400, 408, 425, 446, 339, 421, 467; 126/51, 337, 383; 219/524, 525

[56] References Cited

U.S. PATENT DOCUMENTS

| | | | |
|---|---|---|---|
| 1,051,503 | 1/1913 | Klein | 99/444 UX |
| 1,169,168 | 1/1916 | Lane et al. | 99/446 |
| 1,903,477 | 4/1933 | Rolfson | 99/445 UX |
| 2,114,697 | 4/1938 | Babin | 99/446 UX |
| 2,352,292 | 6/1944 | Schaefer | 99/446 X |
| 2,723,617 | 11/1955 | Dreyfus | 99/444 |
| 2,898,846 | 8/1959 | Del Francia | 99/444 X |
| 2,905,077 | 9/1959 | Del Francia | 99/446 |
| 2,915,000 | 12/1959 | Hetzel et al. | 99/327 |
| 2,997,941 | 8/1961 | Phelan et al. | 99/444 X |
| 3,273,489 | 9/1966 | Wilson | 99/446 X |
| 3,455,233 | 7/1969 | Cable | 99/446 X |
| 3,565,642 | 2/1971 | Hirsch | 99/358 |
| 3,586,518 | 6/1971 | Folmar | 99/444 X |
| 3,604,338 | 9/1971 | Fiedler | 99/446 X |
| 3,714,885 | 2/1973 | Wertheimer et al. | 99/446 X |
| 3,721,178 | 3/1973 | Szabrak et al. | 99/446 X |

Primary Examiner—Harvey C. Hornsby
Assistant Examiner—Arthur O. Henderson
Attorney, Agent, or Firm—Mills & Coats

[57] ABSTRACT

In abstract, a preferred embodiment of this invention is an improved commercial type food cooker which is enclosed with heating elements both above and below the food. A top forms a closure which allows food to be cooked in a much shorter time than by many previous cooking methods, particularly barbecue type methods.

1 Claim, 4 Drawing Figures

COOKER

This invention relates to food processing equipment and more particularly to commercial type cooking apparatus.

In the past, various types of cookers have been developed for commercial applications. These cookers have in many cases been better than that which was available before but have still been inadequate in that they require the meat or other food contained within the cooker to be periodically turned, thus adding to labor cost. Also, many of the prior known cookers have not had methods for adequately retrieving grease and other juices cooked from the food being prepared. Additionally, adequate heat and time controls have not been incorporated with other desirable features to make the commercial size cookers in reality completely automatic with thorough through cooking without burning.

After much research and study into the above mentioned problems, the present invention has been developed to provide a commercial type cooker constructed of stainless steel with drip shield covered lower heating elements and aligned upper heating elements. These are integrated into a well designed unit with heat and time controls for accurately and completely automatically cooking products placed within the cooker. These, combined with other features of the present invention (which will hereinafter be described), summate into a superior cooking unit which allows large amounts of food to be prepared with superior quality control in an automatic fashion.

In view of the above, it is an object of the present invention to provide an improved barbecue type bulk cooker.

Another object of the present invention is to provide a commercial type cooker with drip shielded lower heating elements and corresponding upper heating elements to eliminate turning or otherwise shifting of food during the cooking process.

Another object of the present invention is to provide in combination, a stainless steel commercial type cooker, accurate heat control means, and accurate timer means thereby providing an automatic bulk type cooker.

Another object of the present invention is to provide an automatic type commercial cooker which is convenient to load, unload, and operate.

Another object of the present invention is to provide a bulk type food cooker which is so sized to allow a maximum number of cookers to be placed in any given floor space area.

Another object of the present invention is to provide a commercial barbecue type cooker which is inexpensive to operate and yet has controls for consistant product quality control.

Another object of the present invention is to provide a commercial type cooker which is easy to clean and meets all sanitary code requirements.

Other objects and advantages of the present invention will become apparent and obvious from a study of the following description of the accompanying drawings which are merely illustrative of such invention.

IN THE DRAWINGS

With further reference to the drawings, the cooker indicated generally at 10 includes a base or bottom portion indicated generally at 11 and an upper or top portion indicated generally at 12.

Figure 2:
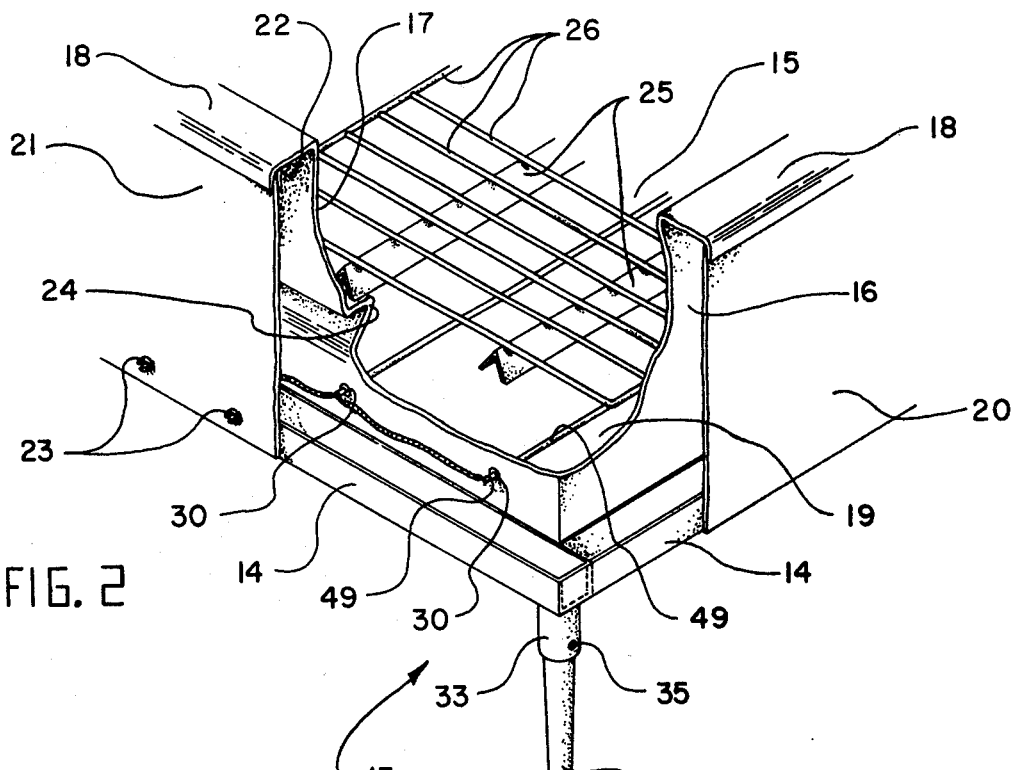
FIG. 2 is a partially cutaway corner perspective view of the cooker.
Figure 3:
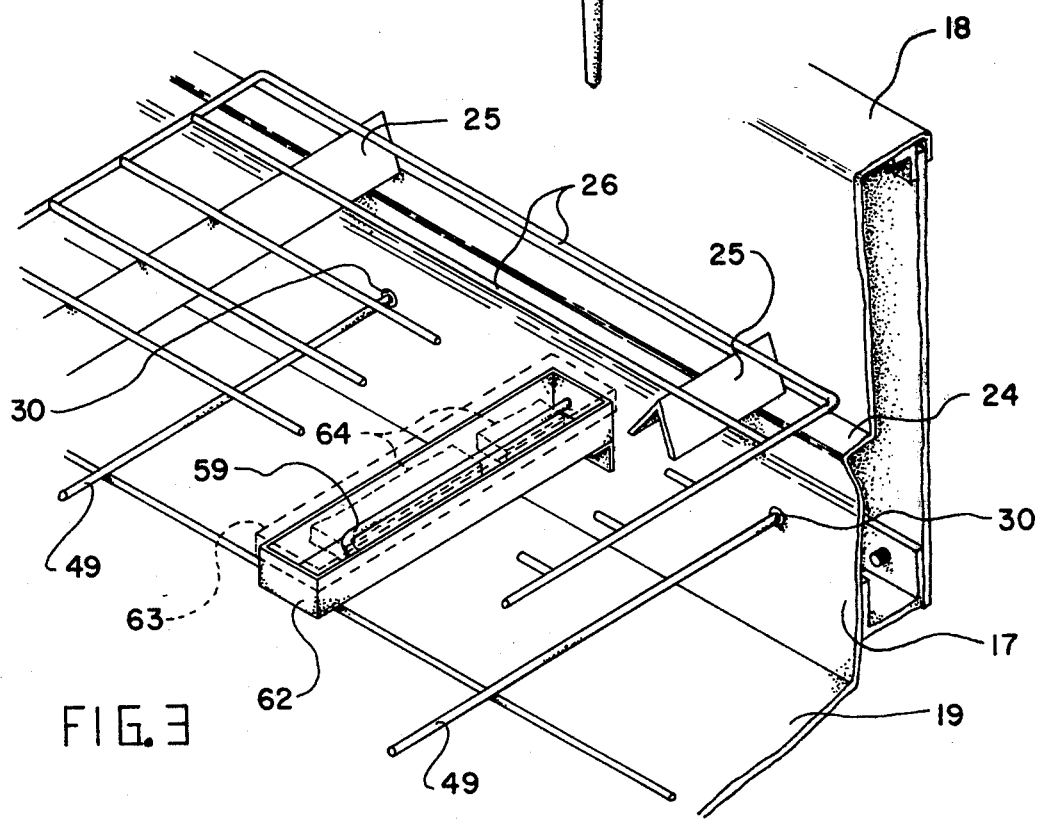
FIG. 3 is a partially cutaway view showing the smoker portion of the present invention.

The base or lower portion 11 includes a generally rectangular frame indicated generally at 13 composed of a plurality of channel members 14 welded or otherwise secured together at their ends as seen particularly clear in FIG. 2.

The interior 15 of the lower portion 11 is defined by end portions 16 and side portions 17. The sides and ends are all welded at their corner joints and each has an outwardly and downwardly projecting flange portion 18. A bottom portion 19 is also provided to complete the defining of interior 15 and is welded about its periphery to each of the side and end portions 16 and 17.

Exterior end portions 20 are provided and are preferably welded to the downward portion of flange 18 of each of the interior end portions along one edge and to the respective end channel member 14 as seen particularly clear in FIG. 2.

Exterior side portions 21 are preferably formed from sheet metal and are adapted to be retained juxtaposed to the exterior edge of flange 18 by angle iron 22 and to respective channel members 14 by metal screws 23.

The purpose of making the exterior side portions 21 removable as herinabove described is to give access to the heating element terminals and associated wiring as will hereinafter be described.

From the above it can be seen that an air space insulated base portion is provided for the cooker 10. This base portion is preferably constructed of all stainless steel to meet health and safety regulations.

Crimp formed longitudinally into each of the front and rear interior portions 17 is a support runner 24. Extending across the interior of the cooker are drip shields 25 which are adapted to supportingly rest on the front and rear runners 24. Each of the drip shields 25 is preferably welded or otherwise secured to a grill type product supporting rack 26. The purpose of the drip shield will hereinafter be made more obvious.

To aid in the removal for cleaning and handling, a plurality of racks 26 are provided. as shown in the drawings, two drip shields are fixed to each rack thus requiring in a preferred embodiment three racks which provide a total of six drip shields to cover the entire interior of the lower portion 11 of the cooker.

A plurality of hinges 27 are secured by any convenient means to one of the side portions 17 considered the back or rear of the cooker. These hinges 27 are also secured to the exterior of upper portion 12.

The construction of upper portion 12 is basically the same as the construction of the lower portion 11 with the exception that support runner 24 is not required and neither are the removable drip shields 25 and their associated racks 26. Because of the similarities of construction, similar parts have been noted with corresponding prime numbers.

Bottom portion 19 is slightly inclined from outer peripheral edges toward central drain opening 28. Similarly, in corresponding top portion 19', vent openings 28' are provided.

Connecting between each pair of end portions 16 and 16' is a releasable closure support 29. Since devices of this type are well known to those skilled in the art, further description of the same is not deemed necessary.

Insulator inserts 30, preferably of the ceramic type, are provided in periodic spacing through each of the interior side portions 17 and 17'. Each of these inserts 30 has a central opening provided therein through which heating elements 49 are adapted to pass. These elements are preferably of the calrod type and the ends of the same are connected together by electrical wires as will hereinafter be described.

A cylindrical collar 33 is preferably fixedly secured to the lower portion of each of the corners of rectangular frame 13. The cylindrical collars are adapted to insertingly receive legs 34 which may be held in place by means such as set screws 35. The reason legs 34 are removable is to take up less space during shipment and also to allow for varied cooker height depending on the length of the legs used.

A plurality of handles 36 are provided on exterior side 21' opposite hinges 27. These handles are preferably of the insulated type and are, of course, provided to assist in raising the top portion 12 of the cooker 10 to the position shown in solid lines in FIG. 1.

Line cord 37 has a receptacle type plug 38 provided thereon for insertion into a standard power outlet (not shown). Line cord 37 passes to switch box 39 and is connected to main switch 40. Fuses 41 and 42 are provided and are operatively connected to double pole, single throw switch 40. Line 43 connects fuse 41 to the solenoid indicated generally at 44. Line 43 splits into normally open solenoid switches 45 and 46.

Switch or contact 45 is connected by lin 47 to lower unit 11 of the cooker. Pairs of heating elements are connected in series to each other with each pair being connected in parallel between lines 47 and 48. These heating elements 49 are preferably of the calrod type although any other suitable element could be used. Line 48 is conncted to fuse 42 as can clearly be seen in the schematic of FIG. 4.

Solenoid contact 46 is connected to line 50 which goes to the upper portion 12 of the cooker. Pairs of heating elements are connected in series to each other with each of the pairs being in parallel between lines 50 and 51. The heating elements 49' are of similar structure and configuration as lower heating elements 49. Line 51 is connected to fuse 42 as is line 48.

The control circuit for the upper and lower heating elements as hereinabove described includes line 52 going to solenoid coil 53. The other side of coil 53 is connected by line 55 back to fuse 42. In lines 55 is operatively connected a variable thermostat 54, a condition light 56 and a standard timer-switch 57. The variable thermostat 54 and the timer-switch 57 can be of any of the common well known types and since these devices are familiar to those skilled in the art, further description of the same is not deemed necessary.

In addition to line 43 connected to fuse 41 is line 58 which is connected to a generally U-shaped heating element 59. This element is preferably of the same type as elements 49 and 49' except for the shape of the same. A line 60 is connected to the side of element 59 opposite line 58 and terminates at fuse 42. A manual switch 61 is provided in line 60 although it is anticipated that a timer-switch could be substituted at this location if so desired.

Figure 4:
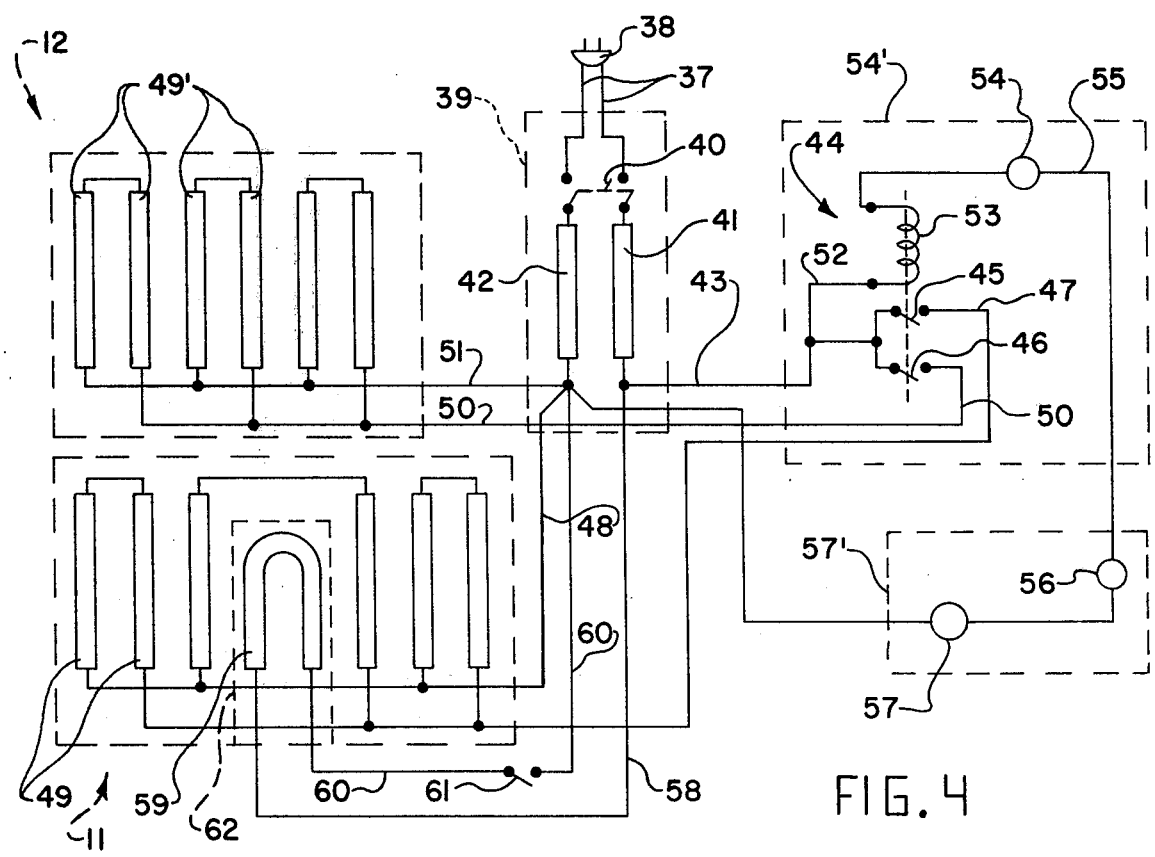
FIG. 4 is a schematic of the electrical system of such invention.

To use the cooker of the present invention, the structure is assembled as hereinabove described and wired according to the schematic of FIG. 4. Once the racks 26 are in place and the upper portion of the cooker opened, the product or products to be cooked can be placed therein on racks 26. This cooker is designed to accommodate any type of food from but not limited to whole hogs and sides of beef to chicken, fish, pies and cakes. Since the cooker is preferably constructed of all stainless steel, it meets U.S. Department of Agricultural requirements for commercial operations.

Figure 1:
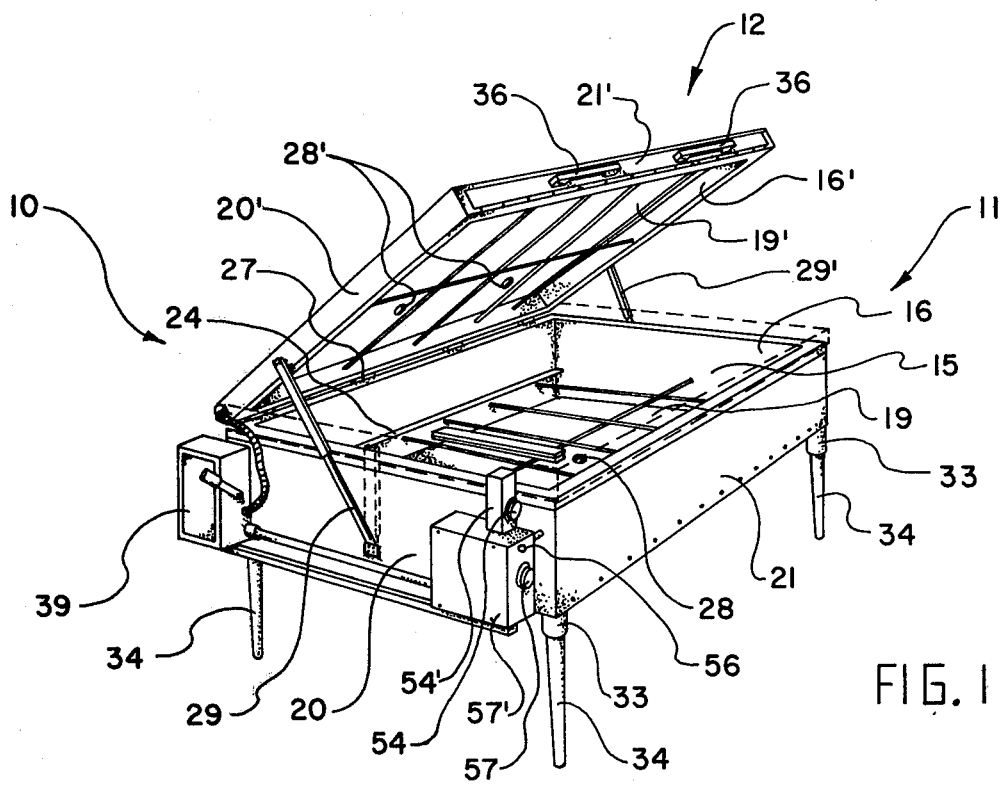
FIG. 1 is a perspective view of the cooker of the present invention in the open position.

Once the fold product to be cooked has been located in the desired position on racks 26, the upper portion 12 of the cooker 10 is lowered to closed position shown in dotted lines in FIG. 1. Thermostat 54 is then set at the desired cooking temperature and timer-switch 57 is set to the desired cooking time. Initially, of course, both the thermostat 54 and timer-switch 57 would be closed allowing current to pass through coil 53 to energize and close solenoid contacts 45 and 46. This allows current to flow through the upper and lower heating elements 49 and 49' to start the cooking process.

Once the desired present cooking temperature has been reached, thermostat 54 will periodically make and break within the preset degree tolerances of the thermostat thus intermittingly allowing current to flow through line 55. This, of course, intermittingly makes and breaks contacts 45 and 46 of solenoid 44 to control the current to heating elements 49 and 49'.

So long as the time set on timer switch 57 has not expired, line 55 will be closed therethrough. Once the time has expired, the timer-switch will open thus interrupting any current flow through line 55 which in turn, of course, de-energizes coil 53 and allows normally open solenoid contacts 45 and 46 to assume that position.

Whenever current is flowing through line 55, condition light 56 will be illuminated but only during such current flow. Either as a substitute for or in addition to light 56, a light (not shown) can be operatively connected to timer swich 57 in such a manner that said light will be illuminated either only during timer operation or will illuminate when the timer-switch opens to indicate that the cooking process has been completed.

When it is desired to give the food being cooked a smoked taste (such as "hickory smoked"), the desired type of wood can be placed within smoker housing 62 and lid 63 replaced thereon. Since the hickory or other type of wood 64 is placed in the smoker in direct contact with heating element 59, with cover 63 in place the wood contained within the housing will not ignite because of lack of oxygen but will smoke profusely when element 59 is heated. To accomplish this smoking process, the smoker switch 60 is closed thus allowing current flow through element 59 to burn the wood 64 thus creating the desired smoke within the cooking area. This smoke surrounds the food within the cooker imparting thereto a "smoked" taste and the excess smoke can be vented through openings 28' of upper portion 12 of the cooker 10. If desired (and as is often required by health codes and agency regulations) an exhaust conduit (not shown) can be provided in association with openings 28'.

In view of the above, it is obvious that the present invention has the advantage of providing an extremely simple and yet highly efficient cooker means which meets health standards for such devices. The cooker has easy access to interior parts for repair or replacement and can readily be partially disassembled for required cleaning.

The terms such as "upper", "lower", "top", "bottom", "sides", "ends" have been used herein merely for covenience to describe the cooker and its parts as oriented in the drawings. It is understood, however, that these terms are no way limiting to the invention since the cooker may obviously be disposed in different positions.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

What is claimed is:

1. A cooking means comprising: a cooker having all of its structural parts constructed of stainless steel including a generally rectangular shaped frame means; downwardly projecting, generally cylindrical collar means fixedly secured to the lower portion of each of the corners of said rectangular frame means; leg means removably attached to said frame means through insertion into said collar means; double walled, opposed pairs of lower sides and ends secured to said frame means, each of said double walled, lower sides and ends defining an insulating dead air space, the exterior wall of each of said lower sides being removable; a generally rectangular bottom secured about its periphery to the lower portion of said lower sides and ends, said sides, ends and bottom defining a box like lower portion of said cooker; double walled, opposed pairs of upper sides and ends secured together to form corners, each of said double walled upper sides and ends defining an insulating dead air space, the exterior wall of each of said upper sides being removable; a generally rectangular shaped top secured about its periphery to the upper portion of said upper sides and ends, said sides, ends, and top defining a box like upper portion of said cooker, hinge means pivotably connecting said upper and lower portions of said cooker; elongated electrical heating elements operatively disposed within said lower portion; thermostatic and timer control means operatively connected to said heating elements for selectively controlling the current flow to such elements whereby the temperature and time of cooking can be regulated; rack means; means for removably supporting said rack means within said lower portion of said cooker; drip shield means secured to each of said rack means in vertical alignment with each of said heating elements whereby juices from products being cooked are prevented from dripping onto said elements; a means for smoking a product being cooked within said cooking means including a housing for wood used to create smoke and an exteriorly controlled electrical heating element operatively mounted within said housing to cause said wood to smolder; and releasable support means operatively secured between said lower and said upper portions of said cooker whereby said upper portion can be releasably held in open position during loading and unloading.

* * * * *